United States Patent Office 3,471,523
Patented Oct. 7, 1969

3,471,523
CONJUGATED VINYL AZIDES AND THEIR PREPARATION
George R. Harvey, Kirkwood, Mo., assignor to Monsanto Company, St. Louis, Mo., a corporation of Delaware
No Drawing. Filed Dec. 29, 1965, Ser. No. 517,488
Int. Cl. C07c 117/00
U.S. Cl. 260—349  9 Claims

ABSTRACT OF THE DISCLOSURE

Conjugated vinyl azides having the formula:

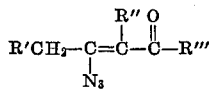

wherein R' is hydrogen, alkyl having a maximum of four carbon atoms or phenyl; R" is hydrogen, alkyl having a maximum of four carbon atoms, phenyl or benzyl; and R''' is alkyl, alkoxy, amino, alkylamino, dialkylamino, phenyl, phenoxy, benzyl and benzoxy.

The compounds are prepared by reacting an azide ion with a conjugated allene compound in the presence of water.

---

This invention relates to a new class of organic chemicals and a method for their preparation. The compounds prepared by the method described below are useful intermediates for the preparation of fungicides and herbicides.

Copending application Ser. No. 517,438, filed Dec. 29, 1965, by George R. Harvey, describes and claims the preparation of useful fungicides by the irradiation of the present conjugated vinyl azides with ultraviolet light.

In copending application Ser. No. 517,474, filed Dec. 29, 1965, by George R. Harvey and Kenneth Wayne Ratts, and now abandoned, there are described and claimed useful compounds and methods for their preparation by reacting the vinyl azides with an organic phosphine.

The novel azides in accordance with this invention are prepared by the reaction of a compound which ionizes to form azide ions, such as the alkali metal azides and particularly sodium azide, with a conjugated allene derivative. The reaction is defined generically by the equation:

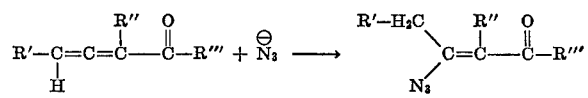

wherein R' is selected from the class consisting of alkyl having up to four carbon atoms, hydrogen and phenyl; wherein R" is selected from the class consisting of alkyl of up to four carbon atoms, hydrogen, phenyl and benzyl, and wherein R''' is selected from the class consisting of alkyl of up to 12 carbon atoms, alkoxy of up to 12 carbon atoms, amino, alkylamino wherein the alkyl moiety has up to four carbon atoms, dialkylamino wherein each alkyl moiety has up to 4 carbon atoms and the aromatic radicals consisting of phenyl, phenoxy, benzyl, benzoxy and the said aromatic radicals containing substituents of the class consisting of alkyl of up to 4 carbon atoms, alkoxy of up to 4 carbon atoms, chlorine, bromine and nitro.

For example, 1,2-hexadien-4-one can be reacted in accordance with the process of this invention to obtain 2-azido-2-hexen-4-one, and, similarly, 3-methyl-1,2-hexadien-4-one can be reacted to obtain 2-azido-3-methyl-2-hexen-4-one.

The novel reaction is conducted in the presence of water and preferably in an aqueous solution of a water-miscible organic solvent, such as dimethylformamide, acetone, tetrahydrofuran and dioxane. The reaction proceeds at room temperatures (15 to 25° C.) but even lower temperatures can be used. With some combination of reactants gentle heating may be beneficial. Stoichiometric proportions of the reactants are usually used, but slight excesses of the azide have a useful effect on reaction rates and yields. Any excess of the azide can be removed by hydrolysis under the conditions of reaction, and more readily when a small amount of hydrochloric acid is present. The desired products can be separated from the reaction mixture by extracting with a suitable solvent, such as diethyl ether.

Further details of the procedure for preparing new compounds are set forth in the following examples.

EXAMPLE 1

Sodium azide (1.93 gms.) was added to a solution of 20 ml. of water and 5 ml. of tetrahydrofuran. This solution was treated with 1.93 grams of ethyl 2-methyl-2,3-butadienoate. The reaction mixture was stirred for 24 hours and acidified with dilute hydrochloric acid. The reaction mixture was then extracted with ether, the extract washed and dried, and the ether evaporated. The residue was identified as ethyl β-azido-α-methylcrotonate.

EXAMPLE 2

Sodium azide was dissolved in 10 ml. of water and added to a 10 ml. tetrahydrofuran solution of ethyl 2,3-butadienoate. After stirring for one hour the solution was acidified with 8% hydrochloric acid and extracted with ether. The ether solution was washed with potassium carbonate solution and concentrated. A light yellow oil was recovered which was identified as ethyl β-azidocrotonate.

EXAMPLE 3

Using the procedure of Example 1 except substituting 2,3 - butadienamide for the ethyl 2 - methyl - 2,3 - butadienoate, a compound was formed having the structure:

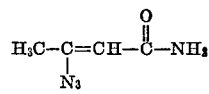

EXAMPLE 4

N-methyl-2,3-butadienamide was reacted with sodium azide by the procedure of Example 2. The compound recovered from the reaction mixture was identified as β-azido-N-methylcrotonamide.

EXAMPLE 5

The procedure of Example 1 was repeated to react p-chlorobenzyl 2,3-butadienoate with sodium azide. The resulting product had the structure

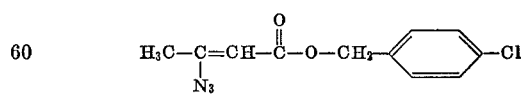

EXAMPLE 6

The reaction of sodium azide with p-nitrophenyl 2,3-butadienoate by the procedure of Example 1 was found to produce p-nitrophenyl β-azidocrotonate.

EXAMPLE 7

Using the procedure of Example 1, approximately equimolar proportions of sodium azide and 3',4'-dibromophenyl 2-ethyl-2,3-butadienoate were mixed in an acetone solution. The product recovered from the reaction mixture was found to have the formula

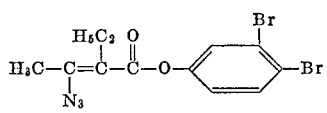

EXAMPLE 8

The procedure of Example 2 was repeated to prepare N,N - dimethyl β - azido β - ethylacrylamide by reacting sodium azide and N,N-dimethyl-2,3-pentadienamide.

EXAMPLE 9

The procedure described in Example 1 was used to react potassium azide and p-ethylphenyl 2,3-butadienoate. The resulting product was found to have the structure:

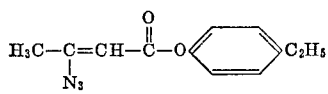

EXAMPLE 10

The reaction of sodium azide and dodecyl 2-methyl-2,3-butadienoate was conducted by mixing the reagents in aqueous dimethylformamide and extracting the reaction mixture with diethyl ether. The product separated from the extract was identified as dodecyl α-methyl β-azidocrotonate.

EXAMPLE 11

Using the procedure of Example 1 sodium azide and p-nitrophenyl 2-(4-bromophenyl)-2,3-butadienoate were reacted. The resulting product was identified as p-nitrophenyl α-(4-bromophenyl-β-azido)crotonate.

EXAMPLE 12

2 - (4 - methylbenzyl) - 2,3-butadienamide was reacted with sodium azide in an aqueous tetrahydrofuran solution. The reaction mixture was extracted with ether and the resulting ether solution evaporated whereby a product was recovered and identified as β-azido α-(4-methylbenzyl)crotonamide.

EXAMPLE 13

Using the procedure of Example 2, β-azido α-(p-nitrophenyl)crotonamide was prepared by reacting sodium azide and 2-(p-nitrophenyl)-2,3-butadienamide.

EXAMPLE 14

The reaction of sodium azide with methyl propadienyl ketone was conducted by the procedure of Example 1. The product separated from the reaction mixture was identified as having the structure

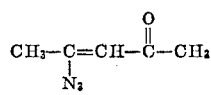

EXAMPLE 15

3-azide-2-methylcrotonophenone was prepared by reacting potassium azide with 2-methyl-2,3-butadienophenone by the method of Example 2. The resulting product was found to have the structure

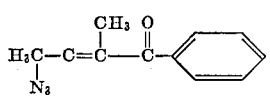

EXAMPLE 16

By the procedure of Example 1 sodium azide and 4'-nitro - 2,3 - butadienophenone were mixed in a dioxane solution. The compound recovered from the reaction mixture was found to have the structure

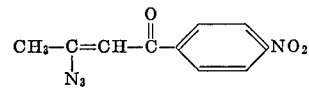

EXAMPLE 17

Using the procdure of Example 2 ethyl 4-benzyl-2,3-butadienoate was reacted with sodium azide. The resulting product was found to be ethyl β-azido-β-phenethylacrylate.

EXAMPLE 18

By the procedure of Example 1 sodium azide was reacted with benzyl propadienyl ketone. The resulting compound recovered from the reaction medium was 1-benzyl-3-azido-2-buten-1-one.

The embodiments of the invention in which an exclusive property or privilege is claimed are defined as follows:

1. A compound of the formula

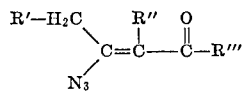

wherein R' is selected from the class consisting of hydrogen, alkyl of up to 4 carbon atoms and phenyl; wherein R'' is selected from the class consisting of alkyl of up to 4 carbon atoms, benzyl, phenyl and hydrogen; and wherein R''' is selected from the class consisting of alkyl of up to 12 carbon atoms, alkoxy of up to 12 carbon atoms, amino, alkylamino of up to 4 carbon atoms in the alkyl moiety, dialkylamino having up to 4 carbon atoms in each alkyl moiety, the aromatic radicals of the class consisting of phenyl, benzyl, phenoxy and benzoxy, and the said aromatic radicals containing substituents selected from the class consisting of alkyl of up to 4 carbon atoms, chlorine, bromine and nitro.

2. A compound of claim 1 wherein R' is hydrogen, R'' is hydrogen and R''' is ethyl.

3. A compound of claim 1 wherein R' is hydrogen, R'' is methyl and R''' is ethyl.

4. A compound of claim 1 wherein R' is hydrogen, R'' is hydrogen and R''' is amino.

5. A compound of claim 1 wherein R' is hydrogen, R'' is methyl and R''' is amino.

6. A method of preparing a compound of the formula

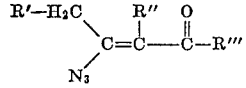

wherein R' is selected from the class consisting of hydrogen, alkyl of up to 4 carbon atoms and phenyl; wherein R'' is selected from the class consisting of alkyl of up to 4 carbon atoms, benzyl, phenyl and hydrogen; and wherein R''' is selected from the class consisting of alkyl of up to 12 carbon atoms, alkoxy of up to 12 carbon atoms, amino, alkylamino of up to 4 carbon atoms in the alkyl moiety, dialkylamino having up to 4 carbon atoms in each alkyl moiety, the aromatic radicals of the class consisting of phenyl, benzyl, phenoxy and benzoxy, and the said aromatic radicals containing substituents selected from the class consisting of alkyl of up to 4 carbon atoms, chlorine, bromine and nitro; which comprises reacting a compound of the formula

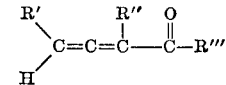

with a compound capable of providing the azide ion in the presence of water.

7. A method of claim 6 wherein R' and R'' are hydrogen, and R''' is ethyl.

8. A method of claim 6 wherein R' is hydrogen, R'' is methyl and R''' is ethyl.

9. A method of claim 6 wherein R' and R" are hydrogen, and R''' is amino.

References Cited

Dorland's Illustrated Medical Dictionary (Saunders Co., Phila., 24th Ed., 1965), p. 589.

Smith: The Chemistry of Open-Chain Nitrogen Compounds, vol. II (Benjamin, N.Y., 1966), pp. 215–19.

Webster's Third New International Dictionary, p. 1058.

HENRY R. JILES, Primary Examiner

C. M. SHURKO, Assistant Examiner